(12) United States Patent
Desai et al.

(10) Patent No.: US 10,445,090 B2
(45) Date of Patent: Oct. 15, 2019

(54) METHOD AND SYSTEM FOR DETERMINING SAFETY COMPLIANCE LEVEL OF A SOFTWARE PRODUCT

(71) Applicant: Hitachi, Ltd., Tokyo (JP)

(72) Inventors: Krishnaji Desai, Bangalore (IN); Geet Tapan Telang, Bangalore (IN); Kotaro Hashimoto, Bangalore (IN)

(73) Assignee: Hitachi, Ltd., Tokyo (JP)

( * ) Notice: Subject to any disclaimer, the term of this patent is extended or adjusted under 35 U.S.C. 154(b) by 229 days.

(21) Appl. No.: 15/653,566

(22) Filed: Jul. 19, 2017

(65) Prior Publication Data

US 2018/0032331 A1 Feb. 1, 2018

(30) Foreign Application Priority Data

Jul. 26, 2016 (IN) .............................. 201641025528

(51) Int. Cl.
*G06F 8/77* (2018.01)
*G06F 17/27* (2006.01)

(52) U.S. Cl.
CPC ............ *G06F 8/77* (2013.01); *G06F 17/2785* (2013.01)

(58) Field of Classification Search
CPC ........................................................ G06F 8/77
USPC ........................................................ 717/101
See application file for complete search history.

(56) References Cited

U.S. PATENT DOCUMENTS

| | | | |
|---|---|---|---|
| 5,521,849 A | 5/1996 | Adelson et al. | |
| 5,950,150 A * | 9/1999 | Lloyd | A62C 37/50 340/506 |
| 6,714,894 B1 * | 3/2004 | Tobey | G06Q 40/00 702/182 |
| 2004/0169591 A1 * | 9/2004 | Erkkinen | G06F 11/3672 340/945 |
| 2007/0136814 A1 * | 6/2007 | Lee | G06F 21/552 726/25 |
| 2014/0109062 A1 | 4/2014 | Mahamuni | |

OTHER PUBLICATIONS

Rajwinder Kaur Panesar-Walawege, et al., "Characterizing the Chain of Evidence for Software Safety Cases: A Conceptual Model Based on the IEC 61508 Standard"; Jan. 2010.

* cited by examiner

*Primary Examiner* — Evral E Bodden
(74) *Attorney, Agent, or Firm* — Mattingly & Malur, PC

(57) ABSTRACT

Disclosed herein is a method and system for determining safety compliance level of a software product. Safety requirements to be complied by the software product are extracted from safety standards. The extracted safety requirements are mapped with corresponding software product artifacts associated with the software product. Compliance of each of the one or more software product artifacts is determined based on the mapping. Thereafter, a score is assigned to of the software product artifacts that are in compliance with the safety requirements. Finally, the safety compliance level of the software product is determined based on the score assigned to the software product artifacts. In an embodiment, the above method helps in an easy interpretation of the standard safety procedures using a Natural Language Processing (NLP) and a Semantic analysis technique. Also, the method minimizes the chances of rejections and/or multiple iterations during safety certification of the software product.

18 Claims, 12 Drawing Sheets

Requirements mapping database 319

| Safety requirements 211 | Safety specific keywords 323 |
|---|---|
| \| Testing | \| test coverage regression performance perf. \| |
| \| Tools | \| Googletest Junit C++ test tool \| |
| \| Bug tracking | \| git github bug issue fix ticket debug \| |
| \| Platform | \| C++ Java Python Linux Mac Android platform \| |
| \| License | \| license oss gpi bsd \| |

METHOD AND SYSTEM FOR DETERMINING SAFETY COMPLIANCE LEVEL OF A SOFTWARE PRODUCT

TECHNICAL FIELD

The present subject matter is related, in general to safety compliance detection of products, and more particularly, but not exclusively to a method and system for determining safety compliance level of a software product.

BACKGROUND

A system whose failure results in loss of life, significant property damage, or damage to the environment is called a safety-critical system. There are well-known examples in the application areas such as medical devices, aircraft flight control, weapon manufacturing, and nuclear systems that use a safety-critical system. From the software perspective, developing the safety critical systems in the required numbers and with adequate level of dependability requires significant advances in areas such as specification, architecture and verification process of individual software component and/or product used in the safety-critical systems.

In addition, one of the basic challenges in the development of a safety-critical system is that, it is not possible to fully test each software component used in the safety-critical system. Performing an exhaustive testing of a software product, by executing entire source code of the software product sounds like an easy process. However, examining all possible execution paths of even the simplest piece of software can be very difficult. For example, a simple flow chart containing five decision points (including a loop) and six functional blocks that, when analyzed, would contain $10^{14}$ number of possible execution paths.

Hence, there may be major gaps between the procedures used in the development of software products and the actual standard procedures to be followed according to one of a standards organization. Similarly, there can be difficulties in interpretation of the standard safety procedures and mapping them to the relevant elements of the software product. This difficulty of mapping may result in a mismatch between the safety procedures followed by the software product to the standard safety procedures. Hence, the developed software product may not be fully compliant with the standard safety procedures, resulting in rejections and/or multiple iterations during certification of such a software product from the certification authorities.

FIG. 1 shows an exemplary environment $100_a$ indicating a conformance gap between the standard safety procedures and the safety procedures incorporated in a software product 101. The standard safety procedures 111a may be extracted from one of a safety standards and manuals 111 related to the software product 101. As show in FIG. 1, the conformance gap in the software product 101 may arise when one or more missing, incorrect and/or additional elements of safety procedures are involved in the software product 101 with respect to the standard safety 111a procedures. Further, the software product 101 may be considered to be fully compliant with the standard safety procedures 111a only when each element of the safety procedures followed by the software product 101 matches with the standard safety procedures 111a.

One of the existing methods for eliminating the conformance gap in the software products comprises an intermediate execution shell and a data processor having an operating system that performs processing operations of the software products on the intermediate shell. The intermediate shell interacts with the operating system and the application software of the software product to emulate a safety critical environment for testing the application software. Thereafter, the application software may be executed on the intermediate shell, thereby rectifying the software product based on the results of execution of the application software. However, the above method does not disclose the aspect of determining safety compliance level of the software product with respect to the standard safety procedures. Also, the existing methods perform an in-depth analysis of the software product by allowing a user to select the required industry compliance standard. However, it requires a continuous intervention of the developers for analyzing the software product and there may be oversight errors due to manual intervention, which may result in non-compliance of safety standards. Hence, there is a need for a method of determining safety compliance of the software products by mapping the safety procedures of the software products with the standard safety procedures.

SUMMARY

Disclosed herein is a method and system for determining safety compliance level of a software product. The objective of the instant disclosure is to verify that the software products are in compliance with the corresponding safety requirements as per criteria of the safety integrity level standards for a software product. The disclosure proposes a method for bridging the compliance gap between the software product and the standard safety procedures based on the specific safety requirements in the standard safety procedures.

Accordingly, the present disclosure relates to a method for determining safety compliance level of a software product. The method comprises the steps of extracting, by a safety compliance determination system, one or more safety requirements from a plurality of sources (102). The one or more safety requirements comprise one or more safety properties to be complied by the software product. Upon extracting, the one or more safety requirements are mapped with corresponding one or more software product artifacts associated with the software product. Further, compliance of each of the one or more software product artifacts is determined based on the mapping. Thereafter, the method assigns a score to the one or more software product artifacts in compliance with the one or more safety requirements. Finally, the method comprises determining the safety compliance level of the software product based on the score assigned to the one or more software product artifacts.

Further, the present disclosure relates to a safety compliance determination system for determining safety compliance level of a software product. The safety compliance determination system comprises a processor and a memory communicatively coupled to the processor. The memory stores processor-executable instructions, which on execution causes the processor to extract one or more safety requirements from a plurality of sources. The one or more safety requirements comprise one or more safety properties to be complied by the software product. Upon extracting, the instructions cause the processor to map the one or more safety requirements with corresponding one or more software product artifacts associated with the software product. Further, compliance of each of the one or more software product artifacts is determined based on the mapping. Thereafter, the instructions cause the processor to assign a score to the one or more software product artifacts in compliance with the one or more safety requirements. Finally, the safety compliance level of the software product is determined based on the score assigned to the one or more software product artifacts.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
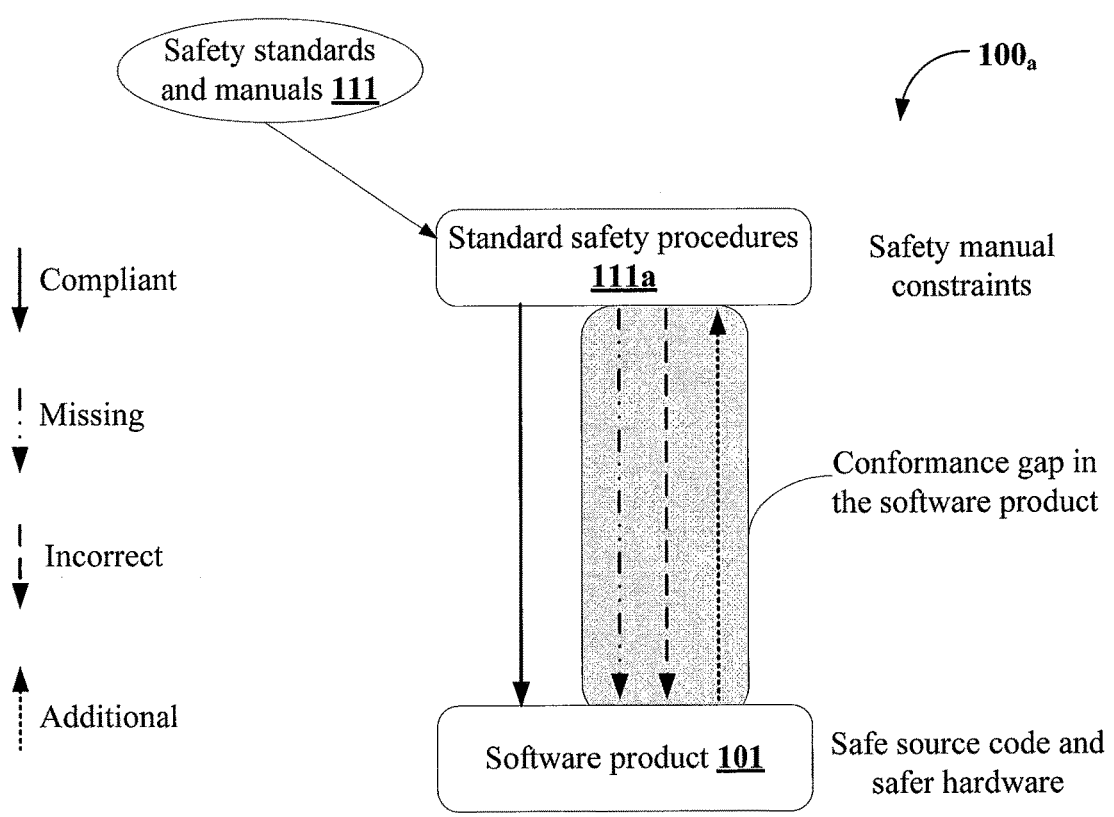
FIG. 1 shows an exemplary environment indicating conformance gap between safety procedures of a software product and the standard safety procedures in accordance with few problems in the art.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and system for determining safety compliance level of a software product. One or more safety requirements required to be complied by the software product and its associated tools are extracted from one or more safety procedures in the safety standards and manuals. A Natural Language Processing (NLP) and semantic analysis technique is used for extracting the safety requirements thus, eliminating the need for manual intervention in identifying the safety requirements from the safety standards. In an embodiment, the safety requirements may also be extracted from one or more documents related to the safety products such as Software Requirements Specification (SRS) document, one or more Acceptance Test Criteria (ATC) associated with the one or more software product artifacts and mailing lists.

Upon extracting the safety requirements, the method analyzes one or more software product artifacts associated with the software products for identifying missing, incorrect, additional and compliant elements of the one or more safety requirements corresponding to the one or more software product artifacts of the software product. Then the extracted safety requirements are mapped with the one or more software product artifacts for identifying those software product artifacts that are to be checked for compliance. Further, based on the results of analysis, a safety compliance report is generated for indicating the missing, incorrect, additional and the compliant elements of the one or more safety requirements. Then, the one or more software product artifacts are scored based on the compliance. Finally, the one or more conformance gaps identified in the safety compliance report may be corrected by modifying the corresponding software product artifacts through use of prior test results, selection of different tools or by developing new tools for the software product artifacts used in the development process of the software product.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 2A:
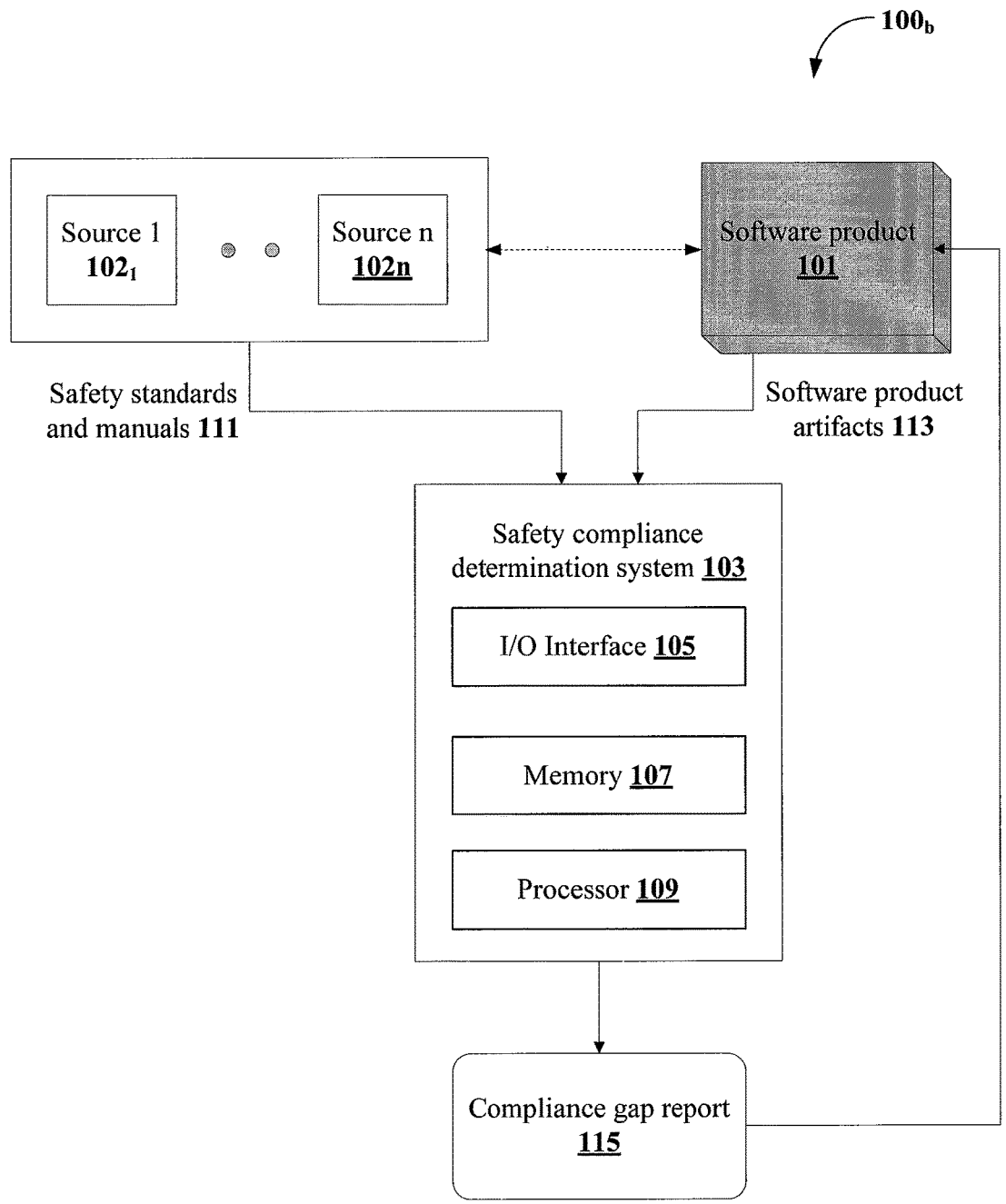
FIG. 2A shows an exemplary environment illustrating a safety compliance determination system for determining safety compliance level of a software product in accordance with some embodiments of the present disclosure.

FIG. 2A shows an exemplary environment illustrating a safety compliance determination system for determining safety compliance level of a software product in accordance with some embodiments of the present disclosure.

The environment $100_b$ comprises a plurality of sources, source 1 $102_1$ to source n $102_n$ (collectively referred as plurality of sources 102), a safety compliance determination system 103 and a software product 101. The plurality of sources 102 are one or more repositories and/or documents from which one or more safety standards and manuals 111 related to a software product 101 may be obtained. As an example, the plurality of sources 102 may include, without limiting to, a Software Requirements Specification (SRS) and design document of the software product 101, mailing lists used during development of the software product 101, software application constraints, architectural documents of the product, goal structured specifications, licenses and tools associated with the software product 101. In an embodiment, the safety compliance determination system 103 comprises an I/O interface 105, a memory 107 and a processor 109. The I/O interface 105 may be configured to receive the one or more safety standards and manuals 111 from the plurality of sources 102. The memory 107 is communicatively coupled to the processor 109. The processor 109 is configured to perform one or more functions of the safety compliance determination system 103 for determining safety compliance level of the software product 101 as explained in the description herein below. In an embodiment, the compliance gap report 115 generated by the safety compliance determination system 103 may be used for performing one or more modifications in the software product 101 for eliminating the one or more missing, incorrect and additional elements in the one or more safety requirements 211.

Figure 2B:
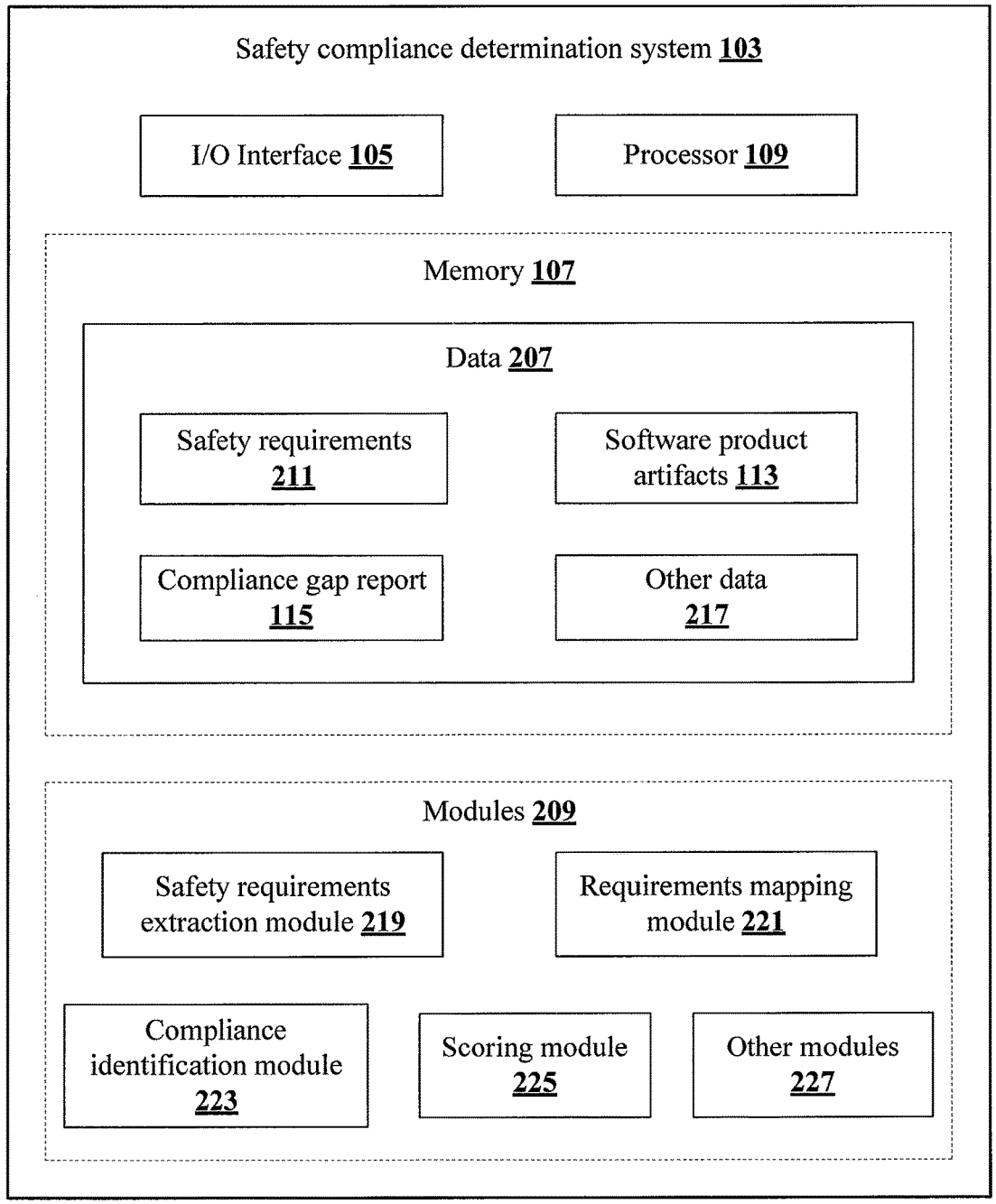
FIG. 2B shows a detailed block diagram illustrating the safety compliance determination system in accordance with some embodiments of the present disclosure.

FIG. 2B shows a detailed block diagram illustrating the safety compliance determination system in accordance with some embodiments of the present disclosure.

In one implementation, the safety compliance determination system 103 comprises data 207 and modules 209 for performing various operations in accordance with the embodiments of the present disclosure. In an embodiment, the data 207 may include, without limiting to, the one or more safety requirements 211, the one or more software product artifacts 113, the compliance gap report 115 and other data 217. In one embodiment, the data 207 may be stored within the memory 107 in the form of various data structures. Additionally, the aforementioned data 207 may be organized using data models, such as relational or hierarchical data models. The other data 217 may store data 207, including temporary data and temporary files, generated by modules 209 for performing the various functions of the multimedia content generator 101.

In an embodiment, the one or more safety requirements 211 comprise one or more safety properties to be complied by the software product 101. The one or more safety requirements 211 may be extracted from the plurality of sources 102 before determining the safety compliance of the software product 101. The one or more safety requirements 211 of the software product 101 may be extracted using a natural language processing and semantic analysis technique. The process of extracting the one or more safety requirements 211 from the plurality of sources 102 is explained briefly in conjunction with functioning of the safety requirements extraction module 219 in the below section.

In an embodiment, the one or more software product artifacts 113 are the documents and procedures related to the software product 101, which are essential for the functioning of the software product 101. As an example, the one or more software product artifacts 113 includes, without limiting to, test cases, test criteria and corresponding test results of the software product 101, traces of execution of the test cases, source code of the software product 101, one or more notes, comments and one or more software product tools 327 associated with the software product 101.

In an embodiment, the compliance gap report 115 may indicate the level of compliance of each of the one or more software product artifacts 113 with one or more safety requirements 211. The compliance gap report 115 may be generated based on the one or more missing, incorrect and additional elements in the one or more safety requirements 211 corresponding to the one or more software product artifacts 113. Further, the compliance gap report 115 may be considered as a reference for performing one or more modifications to the software product 101 in order to enhance the overall safety compliance level of the software product 101. As an example, the compliance gap report 115 may help the developer of the software product 101 in identifying one or more violations of the coding guidelines, difference in standard workflow mechanisms according to the safety standards 111.

In an embodiment, the data 207 may be processed by one or more modules 209 of the safety compliance determination system 103. In one implementation, the one or more modules 209 may also be stored within the memory 107. In an example, the one or more modules 209 may be communicatively coupled to the processor 109 for performing one or more functions of the safety compliance determination system 103. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In one implementation, the one or more modules 209 may include, without limiting to, the safety requirements extraction module 219, a requirements mapping module 221, a compliance identification module 223, a scoring module 225 and other modules 227.

Figure 3A:
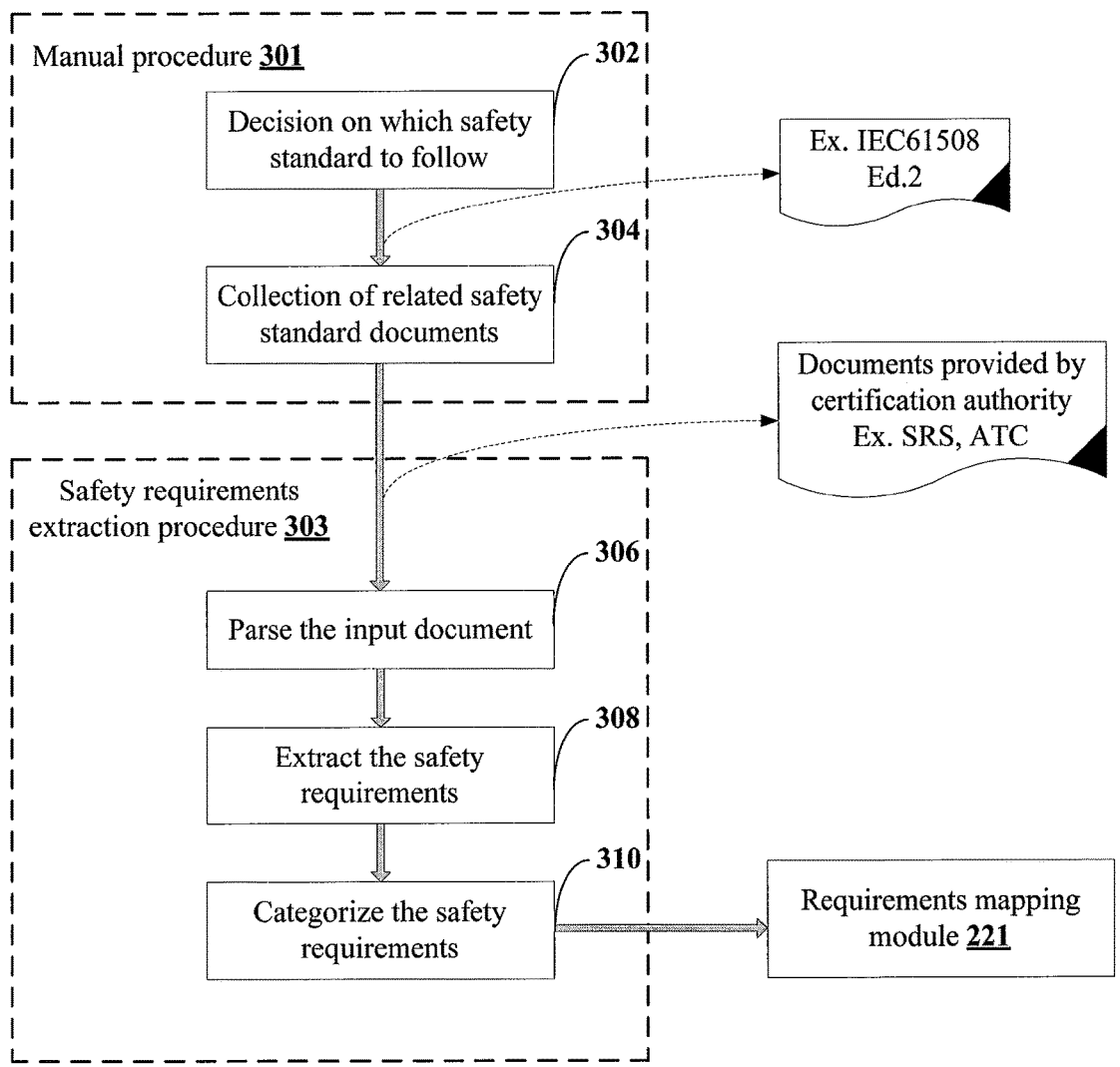
FIG. 3A shows a flowchart illustrating a method for extracting the safety requirements from safety standards and manuals in accordance with some embodiments of the present disclosure.

The safety requirements extraction module 219 may be used for extracting the one or more safety requirements 211 from the plurality of sources 102. In an embodiment, selection of the one or more safety standards and manuals 111 that are appropriate to the software product 101 may be performed manually by a developer, a test engineer and/or any user associated with the software product 101 using the manual procedure as shown in block 301 of FIG. 3A. As a part of the manual procedure, at step 302, the user may take a decision on which safety documents are most appropriate to the software product 101 based on his prior domain experience and/or based on popularity of the plurality of sources 102. As an example, one of the safety standards 111 selected by the user may be IEC-61508, which is an international standard published by the International Electrotechnical Commission (IEC) comprising various rules applied in the domain. At step 304, the user may collect one or more safety documents related to the safety standard selected at step 302. As an example, the one or more safety documents collected by the user may be a SRS document published by a safety certification authority. In another embodiment, the safety requirements extraction module 219 by itself may be configured for selecting the appropriate safety standards 111 from the plurality of sources 102.

At block 303, the safety requirements extraction module 219 extracts the one or more safety requirements 211 from the one or more safety standards 111 selected at step 304. At step 306, the one or more safety documents are parsed using one of a text parsing technique configured in the safety extraction module. At step 308, the one or more safety requirements 211 are extracted from the one or more safety documents parsed at step 306. At step 310, each of the one or more safety requirements 211 that are extracted at step 306 are classified and categorized based on the relevance among each of the one or more safety requirements 211. As an example, the one or more safety requirements 211 that correspond to the aspect of 'testing' may be classified and categorized under the category 'test'. Categorizing each of the one or more safety requirements 211 may help in speeding up the process of mapping each of the one or more safety requirements 211 to the one or more relevant safety product artifacts. In an embodiment, each category of the one or more safety requirements 211 that are obtained at step 310 may be used by the requirements mapping module 221 for mapping each of these safety requirements 211 with the one or more safety product artifacts.

Figure 3B:
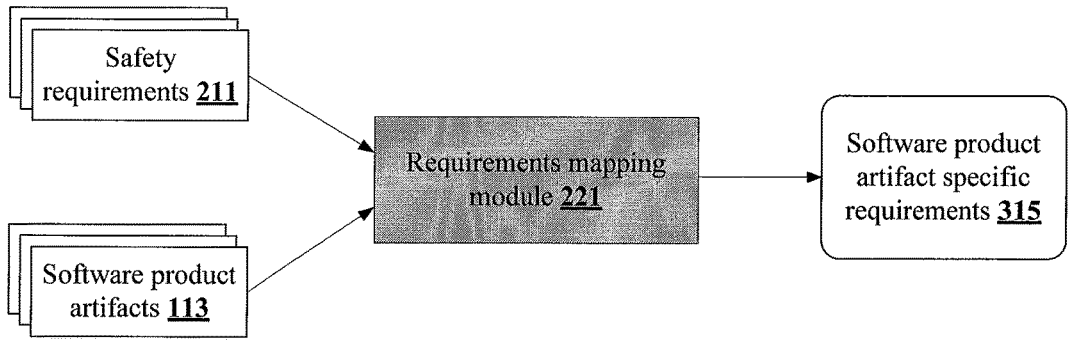
FIG. 3B shows a block diagram illustrating a method for mapping the safety requirements with software product artifacts in accordance with few embodiments of the present disclosure.
Figure 3C:
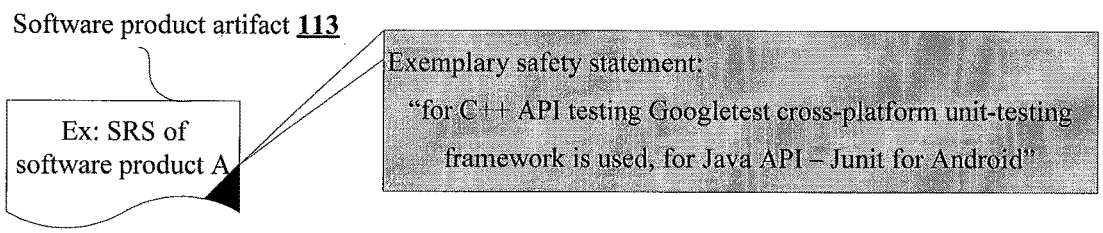
FIGS. 3C-3E illustrates a method of mapping the safety requirements with the safety product artifacts in accordance with some embodiments of the present disclosure.

FIG. 3B is a block diagram of the requirements mapping module 221 which is responsible for mapping each of the one or more safety requirements 211 with the one or more software product artifacts 113. The process of mapping each of the one or more safety requirements 211 to the corresponding elements in the software artifacts of the software product 101 may be explained with the help of an exemplary scenario illustrated in the figures FIG. 3C to FIG. 3E During determination of the safety compliance level of a software product 'A', a software product artifact 113 related to the software product 'A', such as an SRS document of the software product 'A' may be used for mapping. In an embodiment, the requirements mapping module 221 may extract one or more safety specific keywords 323 from the SRS of the software product 'A' before mapping the one or more safety requirements 211 with the SRS of the software product 'A' as shown in FIG. 3C.

Figure 3D:
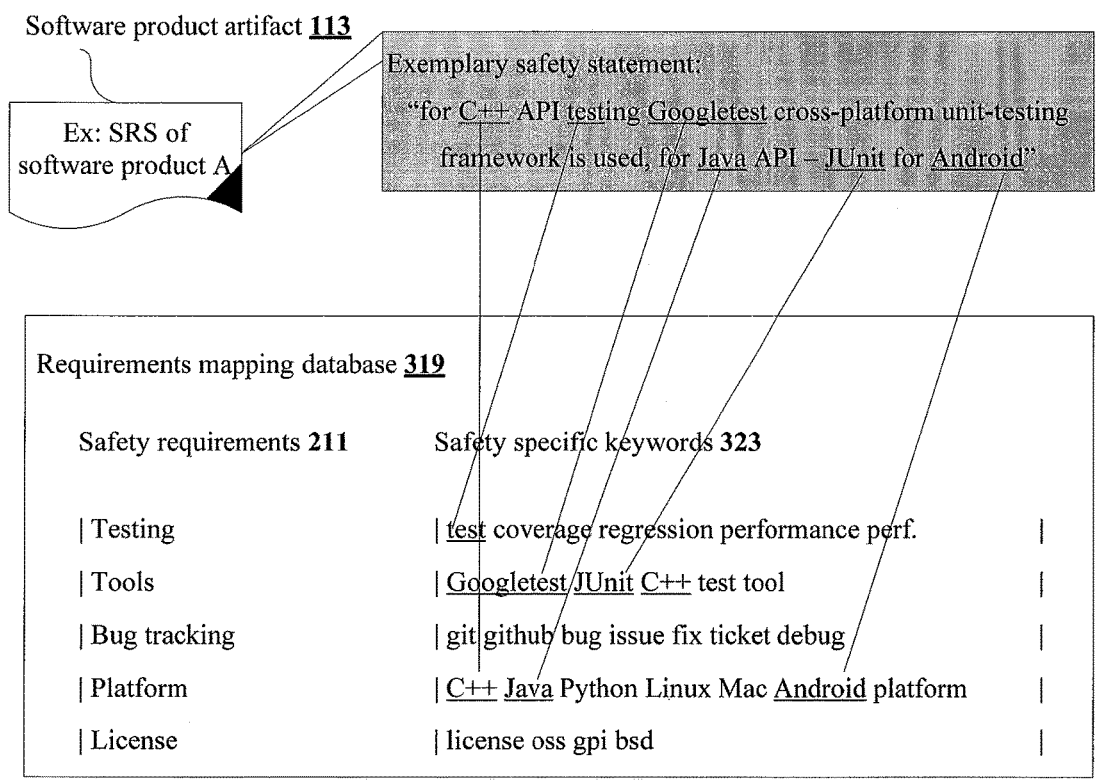

Further, each of the one or more safety specific keywords 323 that are extracted from the SRS of the software product 'A' are mapped against the one or more corresponding safety specific keywords 323 of the one or more safety requirements 211 as shown in FIG. 3D. As an example, the safety specific keywords 323 such as 'C++', 'test', 'Java' and the similar (underlined in FIG. 3D) may be matched with the similar set of safety specific keywords 323 related to the safety requirements 211. In an embodiment, the one or more safety specific keywords 323 corresponding to a particular safety requirement 'testing' may represent the software product tools 327 and safety properties fulfilled by the safety requirement 'testing'.

Figure 3E:
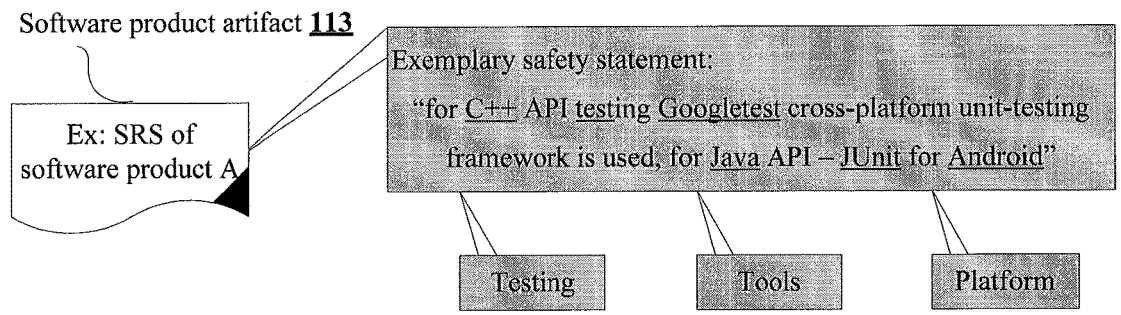
Figure 3E:
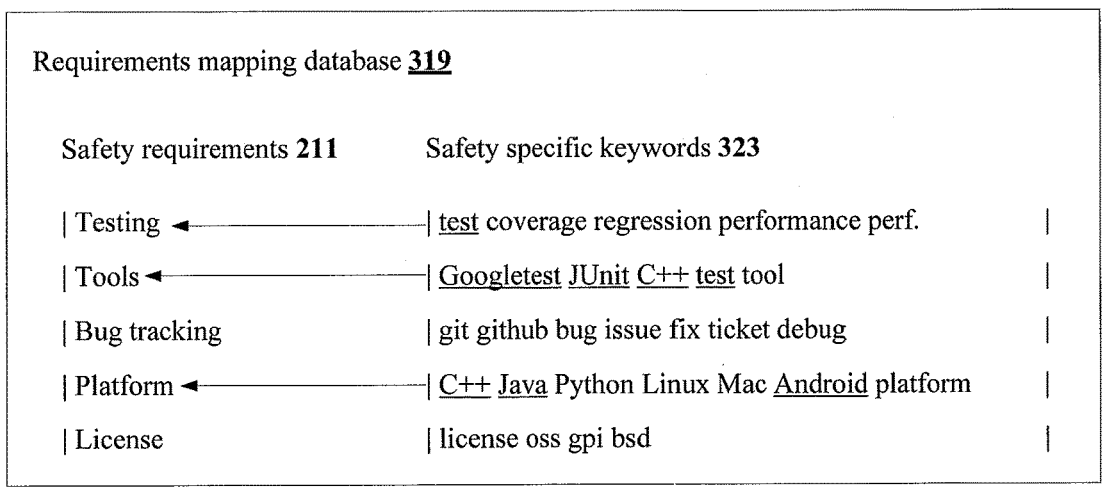

In an embodiment, the one or more safety requirements 211 that match with the one or more safety specific keywords 323 extracted from the SRS of the safety product 'A' considered for determining the safety compliance level of the software product 'A'. In the above scenario, the one or more safety requirements 211 that relate to 'Testing', 'Tools' and 'Platform' elements of the software product 'A' may be considered for determining the safety compliance level of the software product 'A' as shown in FIG. 3E. Finally, the requirements mapping module 221 may provide a list of software requirements that are specific to the one or more software product artifacts 113 upon completion of the mapping.

Figure 3F:
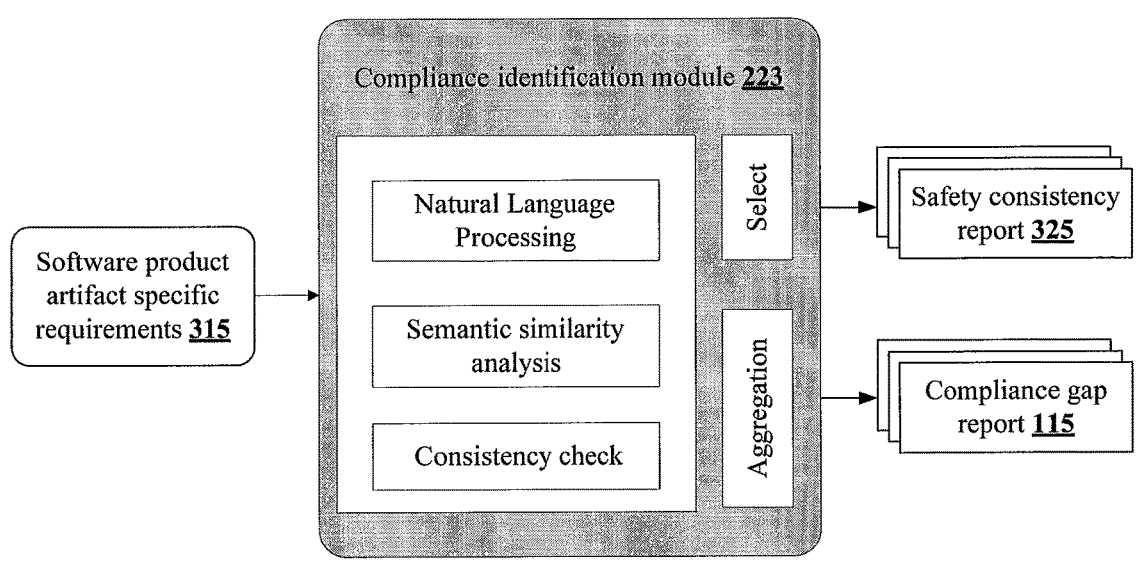
FIG. 3F shows a block diagram illustrating a method for identifying the compliance of the software product in accordance with some embodiments of the present disclosure.

FIG. 3F shows a block diagram of the compliance identification module 223 responsible for determining the safety compliance level of the software product 101. The compliance identification module 223 may take the list of one or more software requirements that are mapped with the one or more corresponding software product artifacts 113 for determining the compliance level of each of the one or more software product artifacts 113. In an embodiment, the compliance identification module 223 may use one of the NLP techniques such as, an Automatic Semantic Role Labeling (ASRL) and semantic similarity analysis for determining the level of compliance. Further, the compliance identification module 223 may also perform a consistency check among each of the mapped safety requirements 211 in order to identify the one or more missing, incorrect and additional elements of the one or more safety requirements 211. The 'Select' and 'Aggregate' functions configured in the compliance identification module 223 may assist in performing appropriate semantic comparisons, consistency checking and for aggregating the results of each analysis. In an embodiment, the compliance identification module 223 may generate reports based on the results of the analysis. As an example, one of the reports generated by the compliance identification module 223 may be safety requirement report 325 that indicates the one or more missing, incorrect and additional elements in each of the one or more safety requirements 211. One of the other reports generated by the compliance identification module 223 may be the compliance gap report 115 that indicates the gaps in the mapping of each of the one or more safety requirements 211 with the one or more software product artifacts 113.

Figure 3G:
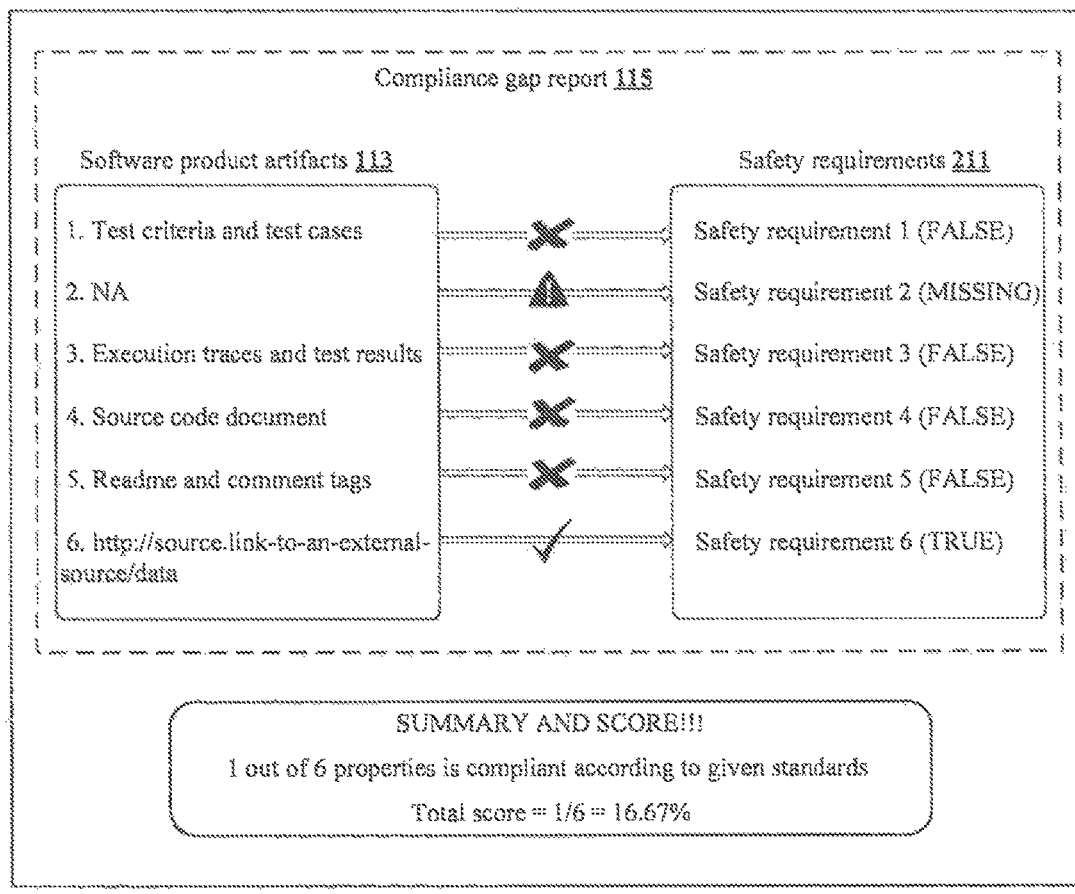
FIG. 3G shows an exemplary view of a compliance gap report in accordance with some embodiments of the present disclosure.

In an embodiment, the scoring module 225 assigns a score to each of the one or more software product artifacts 113 based on the compliance gap report 115 generated by the compliance identification module 223. FIG. 3G shows an exemplary compliance gap report 115 generated by the compliance identification module 223, along with the score assigned by the scoring module 225. As shown in the FIG. 3G, the compliance gap report 115 comprises a list of the one or more software product artifacts 113 and an indication of the compliance of each of the one or more software artifacts with the corresponding one or more safety requirements 211. As an example, a software product artifact 'test criteria and test cases' (indicated by serial number 1 in the list of software product artifacts 113 in FIG. 3G) may be marked as non-compliant if the corresponding safety requirement, 'Safety requirement 1' is not complied by the safety product. Similarly, another software product artifact say, a link to wiki page of the software product (indicated by serial number 6 in the list of software product artifacts 113 in FIG. 3G) may be marked to be compliant with the corresponding 'safety requirement 6' if the 'safety requirement 6' is fully complied by the software product artifact 113.

In an embodiment, the one or more software product artifacts 113 that are not available for matching with the one or more safety requirements 211 may also be marked as non-compliant since the compliance of such a software product artifact 113 is not checked. In the above embodiment, the safety compliance determination system 103 may dynamically generate one or more test cases and/or software product artifacts 113 that are required to be mapped against the one or more safety requirements 211.

In an embodiment, the scoring module 225 may assign a score to each of the one or more software product artifacts 113 based on the compliance gap report 115. As an example, the scoring module 225 may assign a score of value '1' and '0' to the one or more software product artifacts 113 that are compliant and non-compliant respectively. Hence, in case of the exemplary compliance gap report 115 shown in FIG. 3G, the scoring module 225 may assign a score of value '1' to the software product artifact 113 indicated by serial number 6 in the list of software product artifacts 113. Similarly, a score of value '0' may be assigned to each of the other software product artifacts 113 in the list since they are determined to be non-compliant with the corresponding one or more safety requirements 211.

Finally, the scoring module 225 may calculate the overall compliance level of the software product 101 by considering the scores assigned to each of the software product artifacts 113. As an example, the overall score assigned to the software product 101 may be calculated by taking a ratio of sum of the score assigned to the one or more software product artifacts 113 that are in compliance to the total number of the software product artifacts 113 associated with the software product 101. Hence, as per the compliance gap report 115 of FIG. 3G, the overall safety core of the software product 101 may be calculated as below:

Score=(0+0+0+0+0+1)÷6=0.16=16.67% of compliance

Hence, the software product 101 may be considered to be 16.67% compliant with the safety standards and manuals 111 considered for the analysis.

Figure 3H:
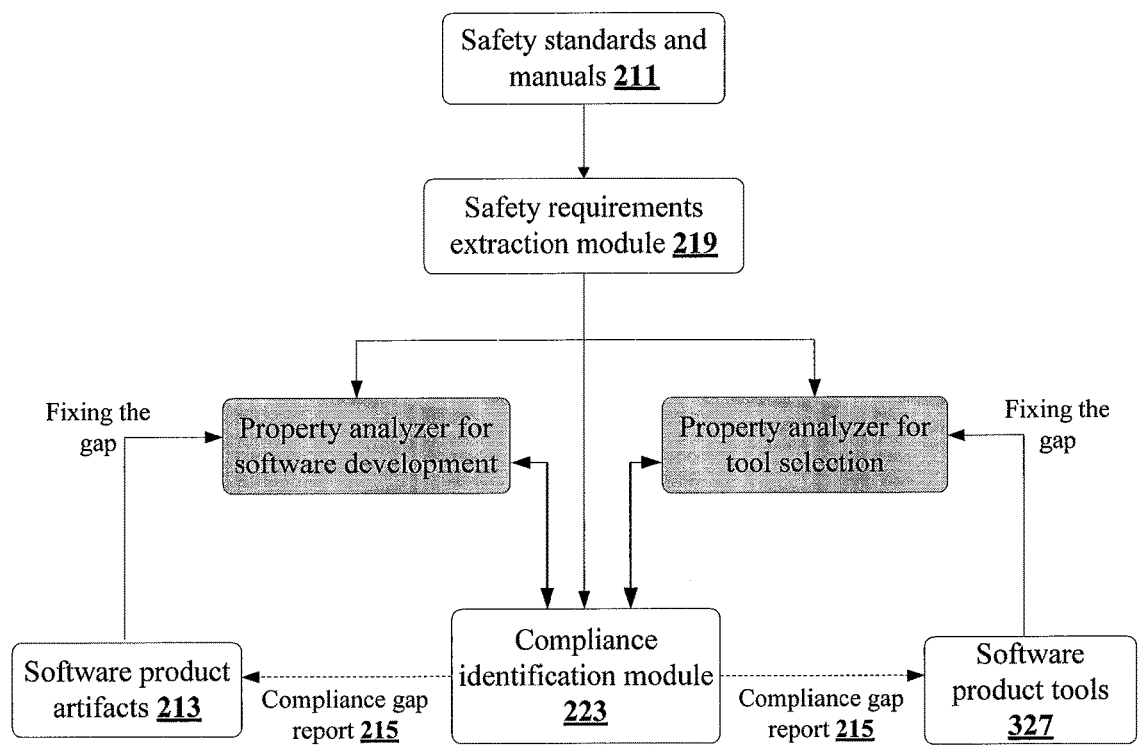
FIG. 3H shows a flowchart illustrating a method for determining safety compliance level of one or more tools associated with the software product in accordance with some embodiments of the present disclosure.

In an embodiment, the safety compliance determination system 103 may determine the safety level of the one or more software product tools 327 associated with the software product 101 using the method explained hereinabove, as represented in FIG. 3H. As shown in the figure, each of the one or more safety requirements 211 that are extracted from the plurality of sources 102 may be mapped with the one or more software product tools 327 associated with the software product 101 using the similar method of mapping the each of the one or more safety requirements 211 to the one or more software product artifacts 113. As an example, the one or more software product tools 327 may include, without limiting to, the software product tools 327 used in requirement analysis, design and development and testing of the software product 101. Further, the compliance identification module 223 may generate the compliance gap report 115 indicating one or more gaps in the compliance of the one or more tools associated with the software product 101. Finally, the scoring module 225 assigns appropriate scores to each of the one or more software product tools 327 associated with the software product 101 based on the compliance gap report 115, thereby determining the safety compliance level of the software product 101.

Figure 4:
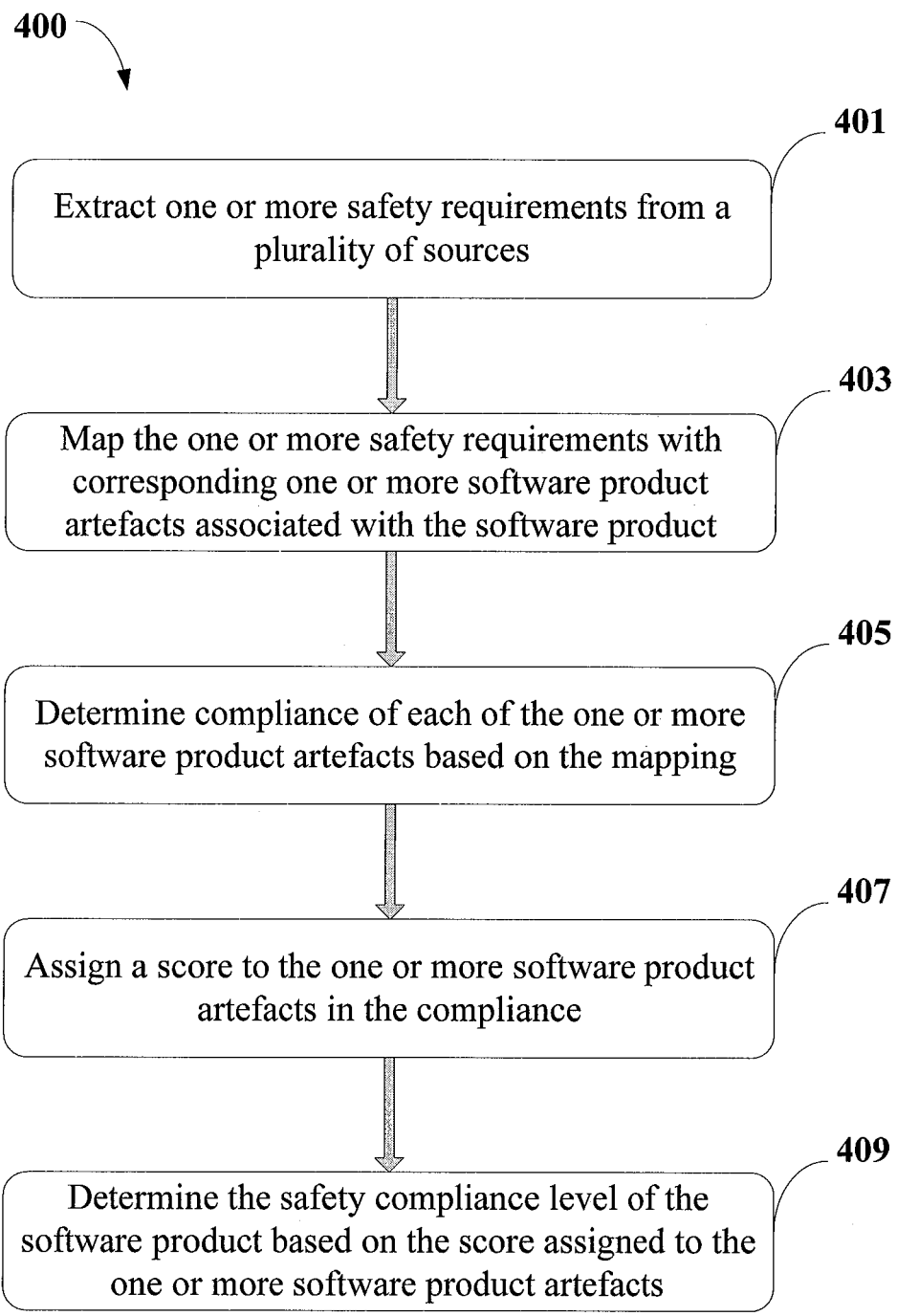
FIG. 4 shows a flowchart illustrating a method for determining safety compliance level of a software product in accordance with some embodiments of the present disclosure.

FIG. 4 shows a flowchart illustrating a method for determining safety compliance level of a software product in accordance with some embodiments of the present disclosure.

As illustrated in FIG. 4, the method 400 comprises one or more blocks for determining safety compliance level of a software product 101 using the safety compliance determination system 103. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the safety compliance determination system 103 extracts one or more safety requirements 211 from a plurality of sources 102. As an example, the plurality of sources 102 used for extracting the one or more safety requirements 211 includes at least one of one or more safety standards and manuals 111 associated with the software product 101, a Software Requirements Specification (SRS) and design document of the software product 101 and mailing lists used during development of the software product 101. The one or more safety requirements 211 comprise one or more safety properties to be complied by the software product 101. In an embodiment, the one or more safety requirements 211 of the software product 101 are extracted using one of a natural language processing and semantic analysis technique configured in the safety compliance determination system 103.

At block 403, the safety compliance determination system 103 the one or more safety requirements 211 with corresponding one or more software product artifacts 113 associated with the software product 101. As an example, the one or more software product artifacts 113 includes at least one of source code of the software product 101, results of execution of the software product 101 and one or more reports generated during development and testing of the software product 101, test cases, test criteria and corresponding test results of the software product 101, traces of execution of the test cases, one or more notes, comments and one or more software product tools 327 associated with the software product 101.

At block 405, the safety compliance determination system 103 determines compliance of each of the one or more software product artifacts 113 based on the mapping. In an embodiment, determining the compliance further comprises identifying one or more missing, incorrect and additional elements in the one or more safety requirements 211 corresponding to the one or more software product artifacts 113.

At block 407, the safety compliance determination system 103 assigns a score to the one or more software product artifacts 113 that are in compliance with the one or more extracted safety requirements 211.

At block 409, the safety compliance determination system 103 determines the safety compliance level of the software product 101 based on the score assigned to the one or more software product artifacts 113. In an embodiment, the safety compliance level of the software product 101 may correspond to a ratio of sum of the score assigned to the one or more software product artifacts 113 in the compliance to total number of the software product artifacts 113 associated with the software product 101.

The safety compliance determination system 103 further comprises generating a compliance gap report 115 for indicating difference in the compliance of each of the one or more software product artifacts 113. The safety compliance level of the software product 101 may be enhanced by performing one or more modifications to the software product 101 based on the compliance gap report 115. In an embodiment, the safety compliance determination system 103 may also determine the safety compliance level of one or more software product tools 327 used in development and testing of the software product 101.

Computer System

Figure 5:
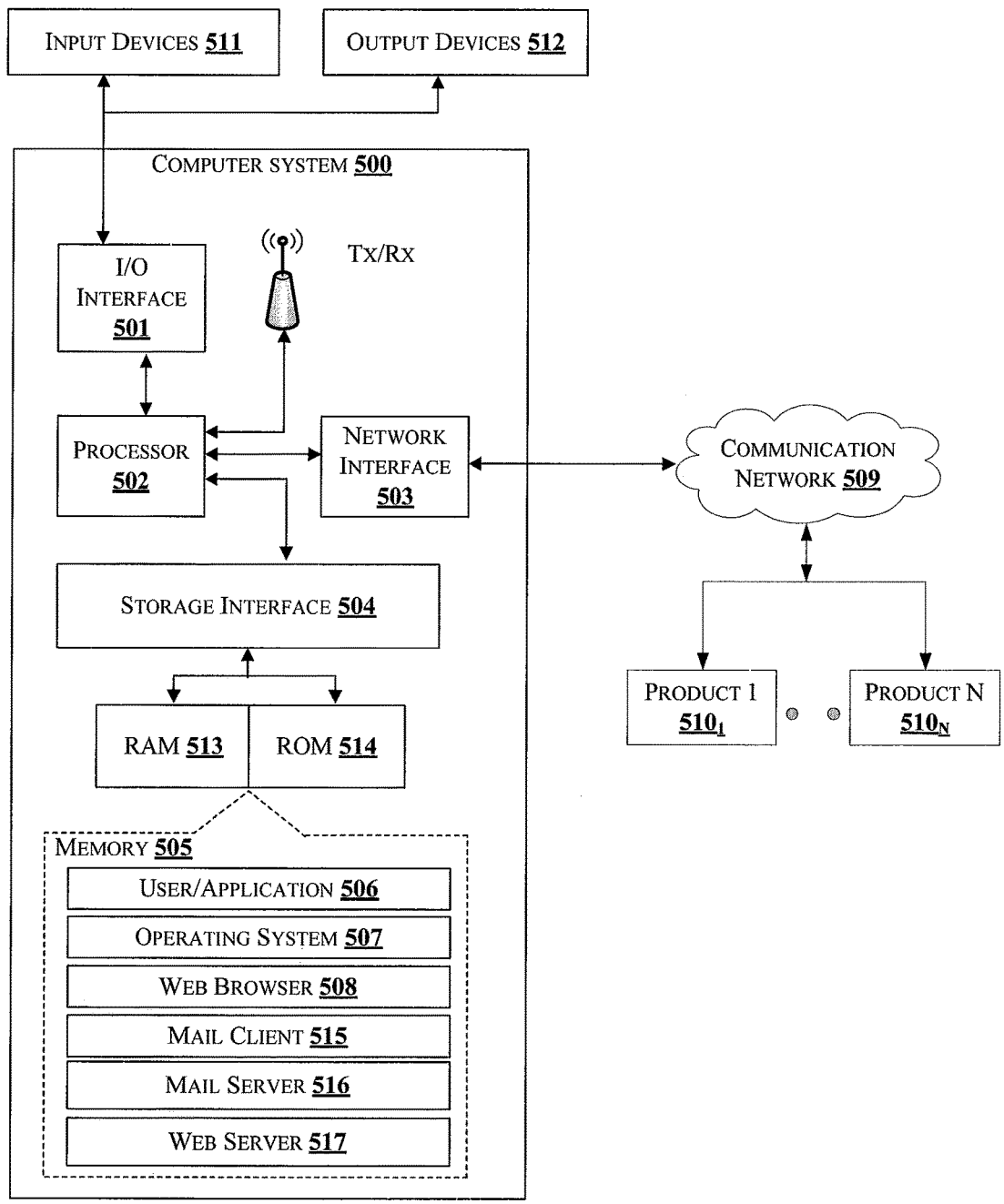
FIG. 5 illustrates a block diagram of an exemplary computer system for implementing embodiments consistent with the present disclosure.

FIG. 5 illustrates a block diagram of an exemplary computer system 500 for implementing embodiments consistent with the present invention. In an embodiment, the computer system 500 may be the safety compliance determination system 103 which is used for determining safety compliance level of the software product 101. The computer system 500 may comprise a central processing unit ("CPU" or "processor") 502. The processor 502 may comprise at least one data processor for executing program components for executing user- or system-generated business processes. A user may include a person, a person using a device such as such as those included in this invention, or such a device itself. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 501, the computer system 500 may communicate with one or more I/O devices (511 and 512).

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 503 and the communication network 509, the computer system 500 may communicate with one or more software products 510 (1 . . . n). The communication network 509 can be implemented as one of the different types of networks, such as intranet or Local Area Network (LAN) and such within the organization. The communication network 509 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc. The one or more software products 510 (1, . . . , n) may include, without limitation, personal computer(s), mobile devices such as cellular telephones, smartphones, tablet computers, eBook readers, laptop computers, notebooks, gaming consoles, or the like.

In some embodiments, the processor 502 may be disposed in communication with a memory 505 (e.g., RAM 513 and ROM 514, etc. shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application data 506, an operating system 507, web server 508 etc. In some embodiments, computer system 500 may store user/application data 506, such as the data, variables, records, etc. as described in this invention. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, UNIX, Unix-like system distributions (e.g., Berkeley Software Distribution (BSD), FreeBSD, Net BSD, Open BSD, etc.), Linux distributions (e.g., Red Hat, Ubuntu, K-Ubuntu, etc.), International Business Machines (IBM) OS/2, Microsoft Windows (XP, Vista/7/8, etc.), Apple iOS, Google Android, Blackberry Operating System (OS), or the like. User interface 506 may facilitate display, execution, interaction, manipulation, or operation of program components through textual or graphical facilities. For example, user interfaces may provide computer interaction interface elements on a display system operatively connected to the computer system 500, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 500 may implement a web browser 508 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 500 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein.

In an embodiment, the present disclosure provides a method for automatically determining safety compliance level of a software product with one or more safety requirements as per given safety standards.

In an embodiment, the method of present disclosure helps in easy interpretation of the standard safety procedures related to the safety product using a Natural Language Processing (NLP) and a Semantic analysis technique.

In an embodiment, the method of present disclosure minimizes the chances of rejections and/or multiple iterations during safety certification of a software product.

In an embodiment, the method of present disclosure provides a means for determining the safety compliance level of a software product during various phases of development of the software product.

In an embodiment, the method of present disclosure provides assistance to developers during the development of safety critical systems by maintaining compliance of the system according to the safety standards.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100$_a$ | Environment (Illustrating conformance gap in the software products) |
| 100$_b$ | Environment (Illustrating Safety compliance determination system of present disclosure) |
| 101 | Software product |
| 102 | Sources |
| 103 | Safety compliance determination system |
| 105 | I/O Interface |
| 107 | Memory |
| 109 | Processor |
| 111 | Safety standards and manuals |
| 113 | Software product artifacts |
| 115 | Compliance gap report |
| 207 | Data |
| 209 | Modules |
| 211 | Safety requirements |
| 217 | Other data |
| 219 | Safety requirements extraction module |
| 221 | Requirements mapping module |
| 223 | Compliance identification module |
| 225 | Scoring module |
| 227 | Other modules |
| 315 | Software product artifact specific requirements |
| 319 | Requirements mapping database |
| 323 | Safety specific keywords |
| 325 | Safety consistency report |
| 327 | Software product tools |

We claim:

1. A method for determining safety compliance level of a software product, the method comprising:
extracting, by a safety compliance determination system, one or more safety requirements from a plurality of sources, wherein the one or more safety requirements comprise one or more safety properties to be complied by the software product;
mapping, by the safety compliance determination system, the one or more safety requirements with corresponding one or more software product artifacts associated with the software product;
determining, by the safety compliance determination system, compliance of each of the one or more software product artifacts based on the mapping;

assigning, by the safety compliance determination system, a numerical score to the one or more software product artifacts in the compliance; and determining, by the safety compliance determination system, the safety compliance level of the software product based on the numerical score assigned to each of the one or more software product artifacts;

wherein the safety compliance level of the software product corresponds to a ratio of a sum of the numerical score assigned to each of the one or more software product artifacts in the compliance to a total number of the software product artifacts associated with the software product.

2. The method as claimed in claim 1, wherein determining the compliance further comprises identifying one or more missing, incorrect and additional elements in the one or more safety requirements corresponding to the one or more software product artifacts.

3. The method as claimed in claim 1, wherein for each software product artifact that is in compliance with the corresponding safety requirement, the numerical score assigned to said each software product artifact is 1, and for each software product artifact that is not in compliance with the corresponding safety requirement, the numerical score assigned to said each software product artifact is 0.

4. The method as claimed in claim 1, wherein the one or more safety requirements of the software product are extracted using one of a natural language processing and semantic analysis technique.

5. The method as claimed in claim 1, wherein the plurality of sources used for extracting the one or more safety requirements includes at least one of one or more safety standards and manuals associated with the software product, a Software Requirements Specification (SRS) and design document of the software product and mailing lists used during development of the software product.

6. The method as claimed in claim 1, wherein the one or more software product artifacts include at least one of source code of the software product, results of execution of the software product and one or more reports generated during development and testing of the software product.

7. The method as claimed in claim 1 further comprising generating a compliance gap report for indicating difference in the compliance of each of the one or more software product artifacts.

8. The method as claimed in claim 7 further comprising enhancing safety compliance level of the software product by performing one or more modifications to the software product based on the compliance gap report.

9. The method as claimed in claim 1 further comprising determining safety compliance level of one or more software product tools used in development and testing of the software product.

10. A safety compliance determination system for determining safety compliance level of a software product, the safety compliance determination system comprising:
 a processor; and
 a memory communicatively coupled to the processor, wherein the memory stores processor-executable instructions, which, on execution, causes the processor to:
  extract one or more safety requirements from a plurality of sources, wherein the one or more safety requirements comprise one or more safety properties to be complied by the software product;
  map the one or more safety requirements with corresponding one or more software product artifacts associated with the software product;
  determine compliance of each of the one or more software product artifacts based on the mapping;
  assign a numerical score to each of the one or more software product artifacts in the compliance; and
  determine the safety compliance level of the software product based on the numerical score assigned to each of the one or more software product artifacts;
  wherein the safety compliance level of the software product corresponds to a ratio of a sum of the numerical score assigned to each of the one or more software product artifacts in the compliance to a total number of the software product artifacts associated with the software product.

11. The safety compliance determination system as claimed in claim 10, wherein the instructions further cause the processor to identify one or more missing, incorrect and additional elements in the one or more safety requirements corresponding to the one or more software product artifacts while determining the compliance of each of the one or more software product artifacts.

12. The safety compliance determination system as claimed in claim 10, wherein for each software product artifact that is in compliance with the corresponding safety requirement, the numerical score assigned to said each software product artifact is 1, and for each software product artifact that is not in compliance with the corresponding safety requirement, the numerical score assigned to said each software product artifact is 0.

13. The safety compliance determination system as claimed in claim 10, wherein the instructions cause the processor to extract one or more safety requirements of the software product using one of a natural language processing and semantic analysis technique.

14. The safety compliance determination system as claimed in claim 10, wherein the plurality of sources-O used for extracting the one or more safety requirements include at least one of one or more safety standards and manuals associated with the software product, a Software Requirements Specification (SRS) and design document of the software product and mailing lists used during development of the software product.

15. The safety compliance determination system as claimed in claim 10, wherein the one or more software product artifacts include at least one of source code of the software product, results of execution of the software product and one or more reports generated during development and testing of the software product.

16. The safety compliance determination system as claimed in claim 10, wherein the instructions further cause the processor to generate a compliance gap report for indicating difference in the compliance of each of the one or more software product artifacts.

17. The safety compliance determination system as claimed in claim 16, wherein the instructions further cause the processor to perform one or more modifications to the software product in order to enhance safety compliance level of the software product based on the compliance gap report.

18. The safety compliance determination system as claimed in claim 10, wherein the instructions further cause the processor to determine safety compliance level of one or more software product tools used in development and testing of the software product.

* * * * *